United States Patent
Okada

(10) Patent No.: US 6,812,463 B2
(45) Date of Patent: Nov. 2, 2004

(54) VEHICLE VICINITY-MONITORING APPARATUS

(75) Inventor: Jun Okada, Aichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 169 days.

(21) Appl. No.: 10/309,197

(22) Filed: Dec. 4, 2002

(65) Prior Publication Data

US 2003/0117522 A1 Jun. 26, 2003

(30) Foreign Application Priority Data

Dec. 14, 2001 (JP) ....................... 2001-381286

(51) Int. Cl.[7] .............. B60Q 1/00; H04N 7/18
(52) U.S. Cl. .................... 250/332; 340/461
(58) Field of Search ................ 250/332, 330; 348/148; 340/461, 901, 903, 345

(56) References Cited

U.S. PATENT DOCUMENTS

| | | | | |
|---|---|---|---|---|
| 6,498,620 B2 | * | 12/2002 | Schofield et al. | 348/148 |
| 6,580,373 B1 | * | 6/2003 | Ohashi | 340/901 |
| 6,611,202 B2 | * | 8/2003 | Schofield et al. | 340/461 |
| 2002/0118282 A1 | * | 8/2002 | Nakamura | 348/148 |
| 2004/0051634 A1 | * | 3/2004 | Schofield et al. | 340/461 |
| 2004/0119633 A1 | * | 6/2004 | Oswald et al. | 342/70 |

* cited by examiner

*Primary Examiner*—Constantine Hannaher
*Assistant Examiner*—Otilia Gabor
(74) *Attorney, Agent, or Firm*—Oliff & Berridge, PLC

(57) ABSTRACT

A vehicle vicinity-monitoring apparatus 1 includes a casing 15 having vicinity-monitoring window portions 15L and 15R and a night-vision window port 15F, a single image pickup device 17 which is contained within the casing 15, and has an image pickup surface 17a which is divided into a vicinity-monitoring image pickup region 17L, 17R and a night-vision image pickup region, an optical system 19 and 21 which is contained within the casing 15.

3 Claims, 3 Drawing Sheets

VEHICLE VICINITY-MONITORING APPARATUS

BACKGROUND OF THE INVENTION

This invention relates to a vehicle vicinity-monitoring apparatus for monitoring the vicinity of a vehicle.

As means for securing visibility at the front side of a vehicle in a dark condition as during the driving at night, there is known a technique in which a night-vision camera, having an infrared camera, is installed on a front portion of a vehicle so as to secure the visibility by a night-vision image obtained by it. On the other hand, as means for eliminating left and right blind angle regions of the vehicle, there is known a technique in which a monitoring camera for monitoring the left and right blind angle regions of the vehicle is installed on the front portion of the vehicle so as to eliminate the left and right blind angle regions of the vehicle by a monitoring image obtained by it.

Usually, an image pickup device, such as a CCD, is used in a monitoring camera, and such an image pickup device has a certain degree of sensitivity even to the infrared region which can not be perceived by a man, and therefore an image of a scene, picked up by it, is different from the scene which the man actually views. Therefore, in the monitoring camera, an image of the scene is picked up through an infrared absorption filter which intercepts the infrared region so that the picked-up image can be made close to the scene which the man actually views. On the other hand, a night-vision camera utilizes infrared, and therefore is used without an infrared absorption filter.

As described above, the monitoring camera and the night-vision camera are different in constituent devices from each other, and therefore in the case of providing the vehicle with both of a night-vision function and a blind angle-monitoring function, it has heretofore been necessary to install both of a camera, exclusively designed for night-vision purposes, and a camera, exclusively designed for blind angle-monitoring purposes, on a front portion of the vehicle.

However, when the camera for night-vision purposes and the camera for the blind angle-monitoring purposes are both installed on the vehicle, there is a disadvantage that the cost is high.

And besides, in some districts, the night-vision function is not so frequently used, and there is a disadvantage that the installation of the night-vision camera makes customers in such districts feel that it is rather expensive, and this would lower the customers' will to purchase the vehicle.

SUMMARY OF THE INVENTION

It is therefore an object of this invention to provide a vehicle vicinity-monitoring apparatus capable of performing both of a blind angle-monitoring function and a night-vision function with a single camera (that is, a single image pickup device).

The above problems have been solved by a vehicle vicinity-monitoring apparatus of the invention of aspect 1 which comprises a casing having a vicinity-monitoring window portion and a night-vision window portion; a single image pickup device which is contained within the casing, and has an image pickup surface which is divided into a vicinity-monitoring image pickup region and a night-vision image pickup region; an optical system which is contained within the casing so as to cause incident light, passing through the vicinity-monitoring window portion, to be focused on the vicinity-monitoring image pickup region of the image pickup device, and also causes incident light, passing through the night-vision window portion, to be focused on the night-vision image pickup region of the image pickup device; and an infrared absorption filter provided on an optical path of travel of the incident light which passes through the vicinity-monitoring window portion in the casing, and is focused on the vicinity-monitoring image pickup region of the image pickup device through the optical system.

In the invention of aspect 2, the infrared absorption filter is mounted on the optical system.

In the invention of aspect 3, the infrared absorption filter is mounted at the vicinity-monitoring window portion in the casing.

DETAILED DESCRIPTION OF THE PREFERRED EMBODIMENTS

Figure 1:
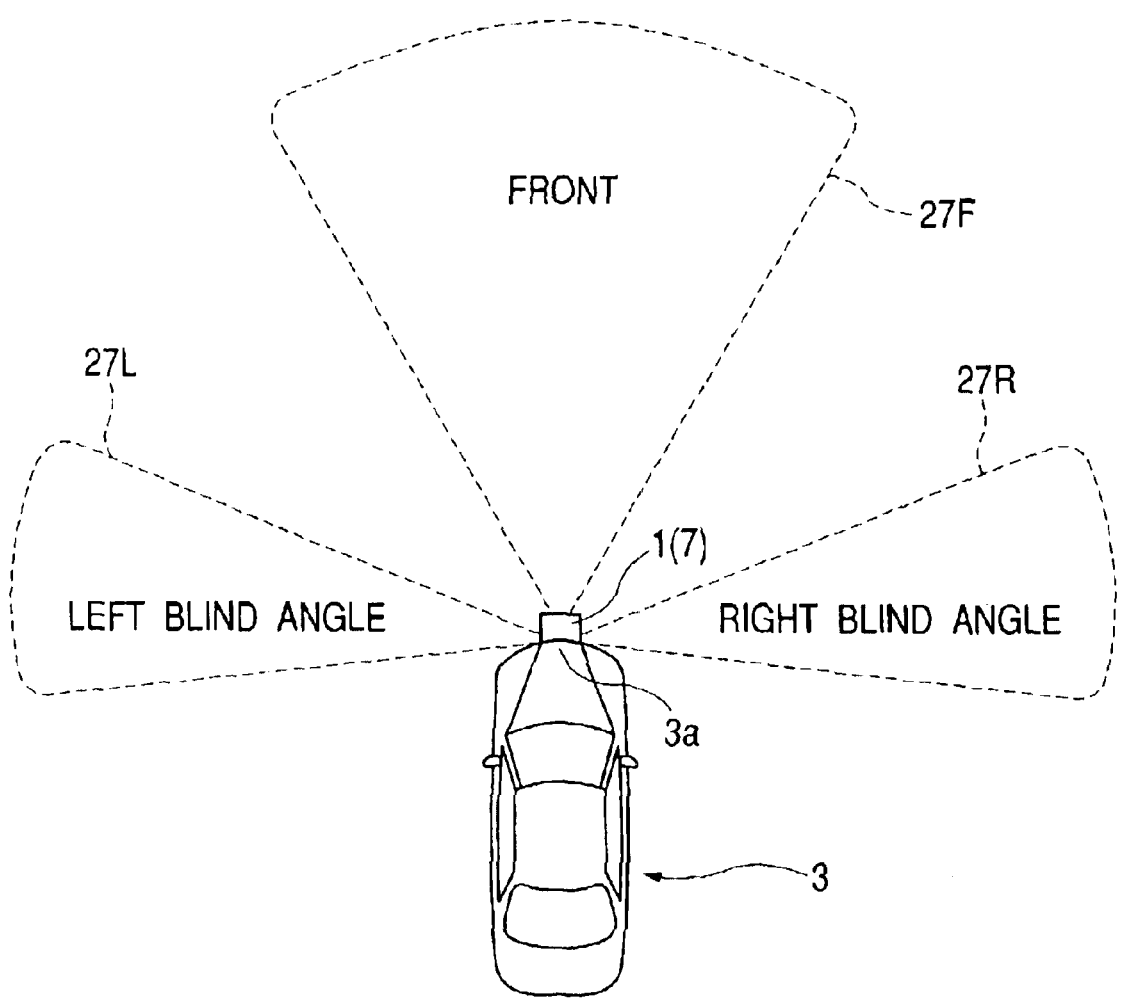
FIG. 1 is a view showing an example of installation of a preferred embodiment of a vehicle vicinity-monitoring apparatus of the invention on a vehicle.
Figure 2:
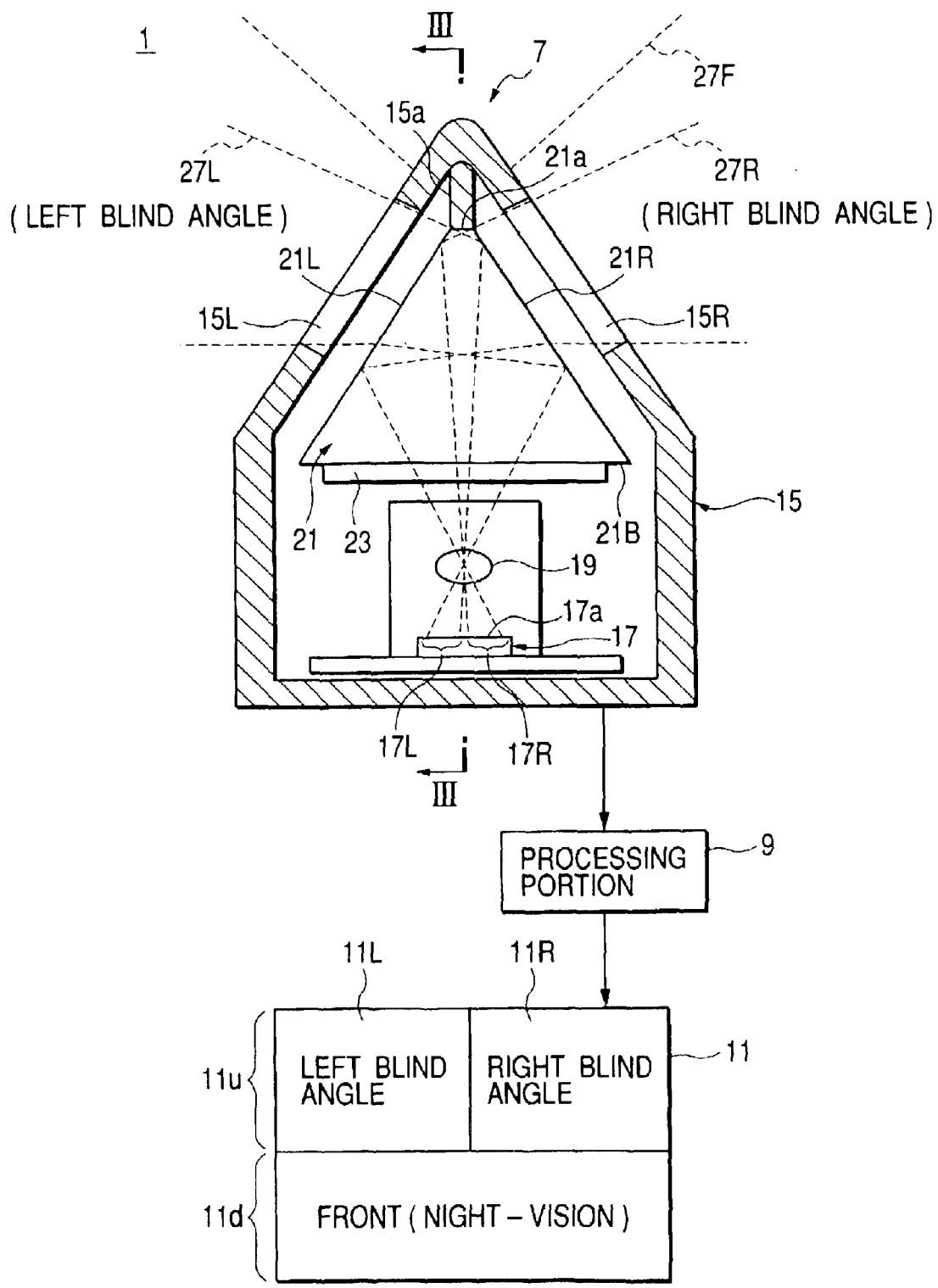
FIG. 2 is a schematic view of the vehicle vicinity-monitoring apparatus of this embodiment.
Figure 3:
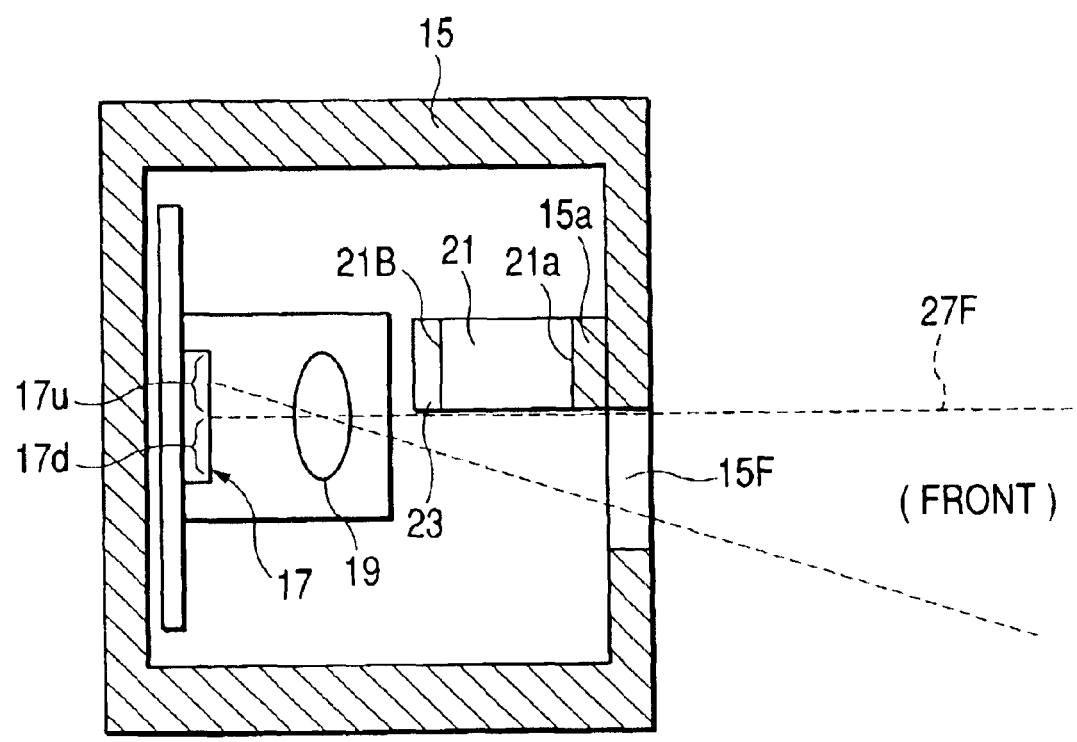
FIG. 3 is cross-sectional view taken along the line III—III of FIG. 2.

FIG. 1 is a view showing an example of installation of a preferred embodiment of a vehicle vicinity-monitoring apparatus of the invention on a vehicle, and FIG. 2 is a schematic view of the vehicle vicinity-monitoring apparatus of this embodiment, and FIG. 3 is cross-sectional view taken along the line III—III of FIG. 2.

As shown in FIGS. 1 to 3, the vehicle vicinity-monitoring apparatus of this embodiment comprises an image pickup device 7, mounted, for example, on a front portion 3 of the vehicle 3 so as to pick up an image of a scene in the vicinity of the vehicle 3, a processing portion 9 for processing a signal representing the image picked up by the image pickup device 7, and a display device 11 mounted within a vehicle room so as to display the image processed by the processing portion 9.

The image pickup device 7 comprises a single image pickup device 17, an image pickup lens 19, disposed in front of the image pickup device 17, a prism 21, and an infrared absorption filter 23, and these component parts are provided within a light-blocking casing 14. Here, the image pickup lens 19 and the prism 21 jointly form an optical system.

A pair of left and right vicinity-monitoring window portions 15L and 15R are formed, for example, respectively in upper portions of left and right side walls of the casing 15 at a front portion thereof, and a night-vision window portion 15F is formed in a lower portion of a front end thereof.

For example, an image pickup surface 17a of the image pickup device 17 is divided into an upper half region 17u and a lower half regions 17d, and for example, the upper half region 17u serves as a night-vision image pickup region while the lower half region 17d serves as a vicinity-monitoring image pickup region. This image pickup device 17 is so arranged that light 27L and light 27R, going out from a rear surface 21B of the prism 21, can be focused on the lower half region 17d of the image pickup surface 17a through the image pickup lens 19, while light 27F, passing through the window portion 15F in the casing can be focused on the upper half region 17u of the image pickup surface 17a through the image pickup lens 19 as will be more fully described hereafter.

The prism 21 is in the shape of an isosceles triangle, and is so arranged that left and right side surfaces 21L and 21R of this prism are directed respectively toward the left and right window portions 15L and 15R in the casing 15, that the rear surface 21B of the prism is directed toward the lower half region 17d of the image pickup surface 17a through the image pickup lens 19 in terms of an optical path and that the prism 21 will not block an optical path of incident light 27F which comes through the window portion 15F in the casing 15, and is directly focused on the upper half region 17u of the image pickup surface 17a through the image pickup lens 19. Therefore, the incident light 27F is focused on the upper half region 17u of the image pickup surface 17a through the image pickup lens 19 without being blocked by the prism 21, and the incident light 27L (27R), passing through the left (right) window portion 15L (15R) in the casing 15, comes into the prism 21 through the left (right) side surface 21L (21R) of the prism, and is internally reflected by the opposite side surface 21R (21L) of the prism, and then goes out form the rear surface 21B of the prism, and is focused on a right (left) half region 17R (17L) of the lower half region 17d of the image pickup surface 17a through the image pickup lens 19.

An apex portion 21a of the prism 21 is covered with a convex portion (or ridge) 15a formed on an inner surface of the front end of the casing 15, and extends in the upward-downward direction. With this construction, light is prevented from being incident on the apex portion 21a of the prism 21, and therefore the incident light 27L (27R), passing through the left (right) window portion 15L (15(R) in the casing 15, will not be incident on the apex portion 21a of the prism 21, and therefore is prevented from being focused as a ghost image on the right (left) half region 17R (17L) of the image pickup surface 17a.

The infrared absorption filter 23 is mounted, for example on the rear surface 21B of the prism 21. With this construction, only a light component of the infrared region is removed from the incident light 27L, 27R, which passes through the left (right) window portion 15L, 15R in the casing 15, and is focused on the lower half region 17d of the image pickup surface 17a of the image pickup device 17 via the optical system 19 and 21, and only other light components than that of the infrared region are focused on the lower half region 17d of the image pickup surface 17a.

Next, the operation of this vehicle vicinity-monitoring apparatus will be described.

As shown in FIG. 2, the incident light 27L and incident light 27R, coming respectively from left and right blind angle scenes, pass respectively through the left and right window portions 15L and 15R in the casing 15, and pass respectively through the left and right prism side surfaces 21L and 21R, and are internally reflected respectively by the opposite prism side surfaces 21R and 21L, and go out from the rear surface 21B of the prism, and pass through the infrared absorption filter 23, with only their respective light components of the infrared region removed, and further are focused respectively on the right half region 17R and left half region 17L of the lower half region 17d of the image pickup surface 17a of the image pickup device 17 through the image pickup lens 19. As a result, the left and right blind angle scenes for vicinity-monitoring purposes are picked up respectively as images each not containing the light component of the infrared region.

On the other hand, as shown in FIG. 3, the incident light 27F, coming from a front scene, passes through the window portion 15F in the casing 15, and is directly focused on the upper half region 17u of the image pickup device 17 through the image pickup lens 19 in such a manner that its light component of the infrared region is not removed. As a result, the front scene for night-vision purposes is picked up as an image containing the light component of the infrared region.

Thus, the images of the left and right blind angle scenes for vicinity-monitoring purposes and the image of the front scene for night-vision purposes are simultaneously picked up by the single image pickup device 17.

An image signal, representing the image picked up by the image pickup device 17, is subjected to a predetermined processing, such as a reversal processing, in the processing portion 9, and is displayed on the display device 11. Here, the left blind angle scene and the right blind angle scene are displayed as erecting, non-reverse images respectively on left and right half regions 11L and 11R of an upper half region 11u of a display screen of the display device 11, while the front scene is displayed as an erecting, non-reverse image on a lower half region lid of the display screen.

In the vehicle vicinity-monitoring apparatus 1 of the above construction, because of the provision of the optical system 19 and 21, the incident light 27F, passing through the night-vision window portion 15F in the casing 15, is focused on the night-vision image pickup region 17u of the single image pickup device 17, while the incident light 27L and incident light 27R, passing respectively through the vicinity-monitoring window portions 15L and 15R in the casing 15, are focused on the vicinity-monitoring image pickup region 17d of the image pickup device 17 via the infrared absorption filter 23. Therefore, the images of the vicinity monitoring-purpose left and right blind angle scenes, from which the light component of the infrared region is removed, and the image of the night vision-purpose front scene, requiring the light component of the infrared region, can be simultaneously picked up by the single image pickup device, and the cost can be reduced since the single image pickup device is used.

And besides, the infrared absorption filter 23 is mounted on the prism 21, and therefore utilizing an existing structure, the infrared absorption filter 23 can be installed on the optical path of travel of the incident light 27L and incident light 27R which pass respectively through the vicinity-monitoring window portions 15L and 15R in the casing 15, and are focused on the vicinity-monitoring image pickup region 17d of the image pickup device 17 through the optical system 19 and 21.

In this embodiment, although the infrared absorption filter 23 is mounted on the prism 21, this infrared absorption filter 23 may be installed at any other suitable position in so far as it is disposed on the optical path of travel of the incident light 27L and incident light 27R which pass respectively through the vicinity-monitoring window portions 15L and 15R in the casing 15, and are focused on the vicinity-monitoring image pickup region 17d of the image pickup device 17 through the optical system 19 and 21. For example, such an infrared absorption filter may be provided at each of the vicinity-monitoring window portions 15L and 15R in the casing 15 or on each of the left and right prism side surfaces 21L and 21R.

In this embodiment, as the optical system for changing the optical paths of travel of the incident light 27L and incident light 27R (passing respectively through the window portions 15L and 15R in the casing 15) so as to direct the incident light 27L and incident light 27R toward the image pickup device 17, there is used the prism 21 which causes the incident light 27L and incident light 27R to be reflected once within it so as to direct the incident right 27L and incident light 27R toward the image pickup device 17 (Therefore, the mirror-image reversal, caused by one reflection within the prism 21, is processed by the signal processing in the processing portion 9). This optical system is not limited to the prism 21. For example, there may be used the type of prism within which each incident light is reflected twice so as to be directed toward the image pickup device 17 (In this case, the mirror-image reversal due to a change of the optical path will not occur, and therefore the processing for the mirror-image reversal in the processing portion 9 is omitted.).

In the invention of aspect 1, because of the provision of the optical system, the incident light, passing through the night-vision window portion in the casing, is focused on the night-vision image pickup region of the single image pickup device, while the incident light, passing through the vicinity-monitoring window portion in the casing 15, is focused on the vicinity-monitoring image pickup region of the image pickup device via the infrared absorption filter. Therefore, the image of the vicinity monitoring-purpose scene, from which the light component of the infrared region is removed, and the image of the night vision-purpose scene, requiring the light component of the infrared region, can be simultaneously picked up by the single image pickup device, and the cost can be reduced since the single image pickup device is used.

In the invention of aspect 2, the infrared absorption filter is mounted on the optical system, and therefore utilizing an existing structure, the infrared absorption filter can be installed on the optical path of travel of the incident light which passes through the vicinity-monitoring window portion in the casing, and is focused on the vicinity-monitoring image pickup region of the image pickup device through the optical system.

In the invention of aspect 3, the infrared absorption filter is mounted at the vicinity-monitoring window portion in the casing, and therefore utilizing an existing structure, the infrared absorption filter can be installed on the optical path of travel of the incident light which passes through the vicinity-monitoring window portion in the casing, and is focused on the vicinity-monitoring image pickup region of the image pickup device through the optical system.

What is claimed is:

1. A vehicle vicinity-monitoring apparatus comprising:
    a casing having a vicinity-monitoring window portion and a night-vision window portion;
    a single image pickup device which is contained within said casing, and has an image pickup surface which is divided into a vicinity-monitoring image pickup region and a night-vision image pickup region;
    an optical system which is contained within said casing so as to cause incident light, passing through said vicinity-monitoring window portion, to be focused on the vicinity-monitoring image pickup region of said image pickup device, and also causes incident light, passing through said night-vision window portion, to be focused on the night-vision image pickup region of said image pickup device; and
    an infrared absorption filter provided on an optical path of travel of the incident light which passes through said vicinity-monitoring window portion in said casing, and is focused on the vicinity-monitoring image pickup region of said image pickup device through said optical system.

2. The vehicle vicinity-monitoring apparatus according to claim 1, wherein
    said infrared absorption filter is mounted on said optical system.

3. The vehicle vicinity-monitoring apparatus according to claim 1, wherein
    said infrared absorption filter is mounted at said vicinity-monitoring window portion in said casing.

* * * * *